United States Patent [19]

Banerjee et al.

[11] Patent Number: 5,389,443
[45] Date of Patent: Feb. 14, 1995

[54] IN-MOLD COATING WITH IMPROVED TOUGHNESS

[75] Inventors: Krishna G. Banerjee, Stow; I. Glen Hargis, Tallmadge; Earl G. Melby, Uniontown; Douglas S. McBain, Norton, all of Ohio

[73] Assignee: GenCorp Inc., Fairlawn, Ohio

[21] Appl. No.: 1,488

[22] Filed: Jan. 7, 1993

Related U.S. Application Data

[63] Continuation-in-part of Ser. No. 828,080, Jan. 30, 1992.

[51] Int. Cl.$^6$ .................. B32B 27/06; B32B 27/38
[52] U.S. Cl. ............................. 428/413; 428/482;
427/386; 427/393.5; 525/90
[58] Field of Search .............. 427/393.5, 386; 525/90;
428/482, 413

[56] References Cited

U.S. PATENT DOCUMENTS

| | | |
|---|---|---|
| 2,750,314 | 6/1956 | Bemmels . |
| 2,829,131 | 4/1958 | Greenspan et al. . |
| 2,838,478 | 6/1958 | Hillyer et al. . |
| 3,119,711 | 1/1964 | Starmann . |
| 3,429,951 | 2/1969 | Childers . |
| 3,437,517 | 4/1969 | Eilerman . |
| 3,538,043 | 11/1970 | Herold . |
| 3,555,112 | 1/1971 | Winkler . |
| 3,651,014 | 3/1972 | Witsiepe . |
| 3,718,714 | 2/1973 | Comstock . |
| 3,827,230 | 8/1974 | Marzocchi et al. . |
| 3,888,645 | 6/1975 | Marzocchi . |
| 4,020,036 | 4/1977 | South, Jr. . |
| 4,031,165 | 6/1977 | Saiki et al. . |
| 4,051,199 | 9/1977 | Udipi et al. . |
| 4,076,767 | 2/1978 | Samejima . |
| 4,131,725 | 12/1978 | Udipi . |
| 4,242,415 | 12/1980 | Feltzin et al. . |
| 4,255,299 | 3/1981 | Daimon . |
| 4,290,939 | 9/1981 | Bertsch . |
| 4,309,473 | 1/1982 | Minamisawa et al. . |
| 4,329,438 | 5/1982 | Yamori et al. . |
| 4,341,672 | 7/1982 | Hsich et al. . |
| 4,413,072 | 11/1983 | Hess . |
| 4,419,487 | 12/1983 | Rowe . |
| 4,478,963 | 10/1984 | McGarry . |
| 4,515,710 | 5/1985 | Cobbledick . |
| 4,524,178 | 6/1985 | Hefner et al. . |
| 4,530,962 | 7/1985 | Alexander . |

(List continued on next page.)

FOREIGN PATENT DOCUMENTS

| | | |
|---|---|---|
| 0234902 | 9/1987 | European Pat. Off. . |
| 0242027 | 10/1987 | European Pat. Off. . |
| 0273522 | 7/1988 | European Pat. Off. . |
| 0310167 | 4/1989 | European Pat. Off. . |
| 0317628 | 5/1989 | European Pat. Off. . |
| 305159 | 12/1988 | Japan . |
| 2165548 | 4/1986 | United Kingdom . |

OTHER PUBLICATIONS

Database WPI Sep.1992, Derwent Publications Ltd., London, GB; AN 92-354793 & JP-A-4 258 637 (Dainippon Ink & Chem KK) 14 Sep. 1992, "abstract."
Database WPI, Week 9223, Derwent Publications Ltd., London, GB; AN 92-188159 & JP-A-4 121 756 (Fjuitsu Ltd.) 22 Apr. 1992, "abstract."
Journal of Applied Polymer Science, vol. 31, No. 1, Jan., 1986, New York, USA, pp. 55–63, Subhas C. Shit, Beni Madhab Mahoto, Mrinal M. Miati, Sukumar Maitt *New Block Copolymers II. Synthesis and Characterization of an ABA-Type block Copolymer*, "Abstract."

Primary Examiner—Patricia A. Short
Attorney, Agent, or Firm—Robert F. Rywalski; Samuel B. Laferty

[57] ABSTRACT

Hydroxy-terminated telechelic rubber polymers and block copolymers of flexible polymers with unsaturated polyester resins improve the elongation and flexural elongation of in-mold coating compositions for fiber reinforced plastics (FRP). An FRP in-mold coating composition based upon vinyl ester resin, ethylenically unsaturated monomers, and at least one of telechelic hydroxy terminated flexible polymers and the block copolymers of functionally terminated flexible polymers with unsaturated polyester polymers are described.

15 Claims, No Drawings

U.S. PATENT DOCUMENTS

| | | |
|---|---|---|
| 4,562,115 | 12/1985 | Hergenrother . |
| 4,748,064 | 5/1988 | Harpell et al. . |
| 4,783,544 | 11/1988 | Yokoshima et al. . |
| 4,833,210 | 5/1989 | Fujii et al. . |
| 4,851,474 | 7/1989 | Willis . |
| 4,851,476 | 7/1989 | Willis . |
| 4,913,955 | 4/1990 | Noda et al. . |
| 4,970,265 | 11/1990 | Willis . |
| 4,981,916 | 1/1991 | Willis . |
| 5,084,508 | 1/1992 | Kagaya et al. . |
| 5,122,553 | 6/1992 | Takayama et al. . |

IN-MOLD COATING WITH IMPROVED TOUGHNESS

CROSS REFERENCE

This reference is a continuation-in-part application of U.S. patent application Ser. No. 07/828,080, filed Jan. 30, 1992, pending entitled "Polyester-Flexible Polymer Block Copolymers and Mixtures Thereof."

FIELD OF INVENTION

This invention relates to a toughened thermosetting in-mold coating composition useful for in-mold coating a molded fiber reinforced thermoset plastic such as a fiberglass reinforced polyester resin (FRP) molding or part.

BACKGROUND OF THE INVENTION

A major deficiency of compression molded thermoset glass fiber reinforced polyester (FRP) moldings is surface imperfections such as pits, pores, surface cracks, waviness, and sink marks. Another deficiency is surface cracks that can develop at low bending strains.

U.S. Pat. No. 4,515,710 describes an in-mold coating composition that is free radically cured to create a thermoset coating having good adhesion to the thermoset substrate, good surface smoothness, and good paintability.

U.S. Pat. No. 4,242,415 describes another in-mold coating composition containing amine-terminated reactive liquid polymers, a vinyl monomer, and crosslinkable ester urethane resins.

It is the object of this invention to provide a vinyl ester resin composition with telechelic flexible polymers or AB, ABA, or $A(BA)_n$ block copolymers having flexible segments (B). These compositions with flexible segments have greater strain to failure and thus maintain good surface quality after deformation of the coated part.

SUMMARY OF THE INVENTION

According to the present invention, an in-mold coating composition comprising a vinyl ester resin, ethylenically unsaturated monomers, low profile additives, carbon black, and free radical initiators is modified with telechelic flexible polymers or ABA-type block copolymers where B is a flexible polymer segment. These modifiers give the in-mold coating greater strain to failure, which means the coating is more durable during processing of the part, and in later applications, of the molded part.

The particular ABA block copolymers useful for this invention are described in the "Detailed Description" while the incorporation of the ABA and/or telechelic polymers is described in the "Further Embodiments of the Detailed Description."

DETAILED DESCRIPTION OF THE BLOCK COPOLYMERS

The B portion of the block copolymers of the present invention can generally be any flexible polymer. Such flexible polymers are generally defined as any polymer which has a Tg of about 0° C. or less and preferably below minus 20° C., often are liquid, and are readily known in the art and to the literature, including the preparation thereof.

One such class of flexible polymers is the various conjugated dienes made from one or more monomers having from 4 to 12 carbon atoms, desirably from 4 to 8 carbon atoms with 4 or 5 carbon atoms being preferred. Examples of specific dienes include butadiene, isoprene, 2,3-dimethyl-1,3-butadiene, pentadiene, hexadiene, 4,5-diethyl-1,3-octadiene, and the like, with butadiene and isoprene being preferred. The structure of such conjugated dienes is generally such that it has a Tg within the above-noted ranges. Such polymers are terminated with either one or two functional end groups wherein the functional end group is hydroxyl, amine, or carboxyl. Thus, the B block can be a mono- or di- hydroxyl terminated flexible polymer, a mono or diamine terminated flexible polymer, or a mono- or di- carboxyl terminated flexible polymer. Such polymers are well-known to the art and are commercially available as from the B. F. Goodrich Chemical Co., under the Hycar® trademark.

Another class of the B block flexible polymer is the various hydrogenated dienes or polyolefins which are mono or di-hydroxyl, carboxyl, or amine terminated. Such polymers, as well as the preparation thereof, are well known to the art and to the literature. Typical diene polymers are made from one or more conjugated dienes, having from 4 to 10 carbon atoms, such as 1,3-butadiene, isoprene, dimethyl butadiene, and the like. The polymerization of the diene monomer, typically, may be done via anionic initiation (e.g. with di-lithium hydrocarbyl initiators) or via free-radical polymerization, e.g. by initiation with hydrogen peroxide, which also introduces hydroxy end groups. In case of anionic polymerization, OH-end groups are advantageously introduced by reaction of the polymeric carbanion chain ends with ethylene oxide. These techniques are generally well known to the literature. The hydroxy-functional polydienes may be hydrogenated, for example, partially or substantially (i.e., at least 50, 70, or 90 percent of the unsaturated sites), and even completely hydrogenated, according to any conventional method known to the art and to the literature. Complete hydrogenation of various diene polymers such as 1,4-polyisoprene is equivalent to an alternating ethylene/propylene hydrocarbon polymer. The hydrocarbon polymers generally have a number average molecular weight from about 500 to 15,000 and preferably from about 1,000 to about 8,000. The polymers are desirably liquid at room temperature, but can have a melting point up to about 80° C. Preferred polymers are hydroxyl functional telechelic, hydrogenated diene polymers containing 2 to 6 and preferably 2 to 4 hydroxy end groups per polymeric molecule (polymer unit).

The hydroxyl, carboxylic or amine terminated polyolefins are generally made from one or more olefins having from 2 to 6 carbon atoms such as ethylene, propylene, butylene, and the like. Such functional polyolefins can also be made by utilizing minor amounts (i.e., up to about 50 mole percent and preferably up to 20 mole percent) of ethylenically unsaturated comonomers such as styrene, vinyl toluene, alpha-methylstyrene, divinylbenzene, and similar aromatic monomers; or vinyl monomers, such as acrylonitrile, methacrylonitrile, vinylidene chloride, and similar aliphatic vinyl monomers; or hydroxyl functional ethylenically unsaturated monomers such as 2-hydroxyl ethyl acrylate and methacrylate, 2-hydroxy propyl acrylate and methacrylate and similar hydroxy alkyl acrylates. Regardless of the type of polyolefin, it should contain either one or two hydroxyl groups per average molecule.

An especially preferred hydrogenated butadiene polymer is commercially available as Polytail H and Polytail HA sold by Mitsubishi Kasei Corp., and has the very generalized structure:

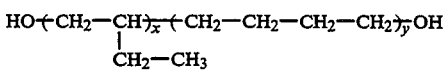

wherein 1,2-butylene (x) and 1,4-butylene (y) segments are randomly distributed and the structure can contain additional —OH groups.

Still another class of the B block flexible polymer is the various mono- or di- hydroxyl, amine, or carboxyl terminated nitrile containing copolymers. These copolymers are prepared in accordance with conventional techniques well known to the art and to the literature and are generally made from one or more monomers of acrylonitrile or an alkyl derivative thereof with one or more conjugated dienes and optionally one or more monomers of acrylic acid, or an ester thereof. Examples of acrylonitrile monomers or alkyl derivatives thereof include acrylonitrile and alkyl derivatives thereof having from 1 to 4 carbon atoms such as methacrylonitrile, and the like. The amount of the acrylonitrile or alkyl derivative monomer is from about 1 percent to about 50 percent by weight and preferably from about 5 percent to about 35 percent by weight based upon the total weight of the nitrile containing copolymer.

The conjugated diene monomers generally have from 4 to 10 carbon atoms with from 4 to 6 carbon atoms being preferred. Examples of specific conjugated diene monomers include butadiene, isoprene, hexadiene, and the like. The amount of such conjugated dienes is generally from about 50 percent to about 99 percent by weight and preferably from about 55 percent to about 75 percent by weight based upon the total weight of the nitrile rubber forming monomers. Such mono or difunctional nitrile rubbers can be readily prepared generally containing either hydroxyl or carboxyl end groups and are known to the art and to the literature and are commercially available such as from The B. F. Goodrich Company under the tradename Hycar ®.

Yet another class of the B block flexible polymers is the various copolymers made from vinyl substituted aromatics having from 8 to 12 carbon atoms and conjugated diene monomers generally having from 4 to 12 carbon atoms, desirably from 4 to 8 carbon atoms, and preferably 4 or 5 carbon atoms. Examples of suitable aromatic monomers include styrene, alphamethyl styrene, and the like, with specific examples of conjugated dienes including hexadiene, isoprene, butadiene, and the like. A preferred copolymer is a random styrene butadiene copolymer. The amount of the vinyl substituted aromatic component, such as styrene, is generally from about one part to about 50 parts, and desirably from about 1 part to about 30 parts by weight, based upon the total weight of the copolymer. The preparation of such polymers having mono or di- hydroxyl, amine, or carboxyl terminated vinyl substituted aromatic conjugated diene copolymer are well known to the art and to the literature.

A still further class of the B block flexible polymers is the various polyethers which are either mono- or di-hydroxyl, amine, or carboxyl terminated. Such polyether polyols are generally made by reacting one or more alkylene oxides having from 2 to 10 carbon atoms such as propylene oxide with a strong base such as potassium hydroxide, preferably in the presence of water, glycols and so forth. Polyether polyols can also be made by ring opening polymerization of tetrahydrofuran or epichlorohydrin using acid catalysts. Examples of polyethers which can be utilized are those which are produced as by polymerization of tetrahydrofuran or epoxides (such as ethylene oxide, propylene oxide, butylene oxide, styrene oxide, or epichlorohydrin), or by addition of epoxide compounds (preferably ethylene oxide or propylene oxide), alone, in a mixture, or in succession, to starting components with reactive hydrogen atoms such as water, polyhydric alcohols, ammonia, or polyfunctional amines. The above mono- or dihydroxyl, amine, or carboxyl terminated polyethers, as well as the preparation thereof, are well known to the art and are commercially available. Hydroxy terminated polytetrahydrofurans are commercially available as from DuPont as Terethane. Hydroxy terminated polypropylene oxides are commercially available as from Dow Chemical as Voranol and amine terminated polyethers are commercially available as from Texaco as Jeffamine.

The polyester or A block is generally an unsaturated polyester having an average molecular weight of between 100 or 500 to 2,000 or 5,000 and has one, or less desirably two, functional end groups thereon such as hydroxyl, carboxyl, or amine. The polyesters are made by the copolymerization of generally cyclic ethers typically containing 2 or 3 carbon atoms in the ring and an unsaturated anhydride, as well as optional saturated anhydrides using double metal complex cyanide catalysts. Generally any cyclic oxide can be utilized such as 1,2-epoxides, oxetanes, and the like, with the cyclic ether having a total of up to 18 carbon atoms, as for example 2 carbon atoms in the ring and up to 16 carbon atoms in the side chains. Such cyclic oxide monomers can also contain one or more aliphatic double bonds and preferably only contain one aliphatic carbon to carbon double bond. Examples of suitable cyclic oxides include ethylene oxide (1,2-epoxy ethane), 1,2-propylene oxide, 1,2-butene oxide, 1,2-hexene oxide, 1,2-dodecane monoxide, isobutylene oxide, styrene oxide, 1,2-pentene oxide, isopentene oxide, 1,2-heptene oxide, allyl gylcidyl ether, isoheptene oxide, 1,2-octene oxide, methyl glycidyl ether, ethyl glycidyl ether, phenyl glycidyl ether, butadiene monoxide, isoprene monoxide, styrene oxide, tolyl glycidyl ether, 1,2-pentadecene oxide, epichlorohydrin, glycidoxypropyltrimethoxysilane, and the like. Generally, ethylene oxide, propylene oxide, and butylene oxide are preferred.

Generally five-member cyclic anhydrides are preferred, especially those having a molecular weight between 98 and 400. Mixed anhydrides as well as mixtures of anhydrides may be used. Examples of preferred anhydrides include those of maleic, phthalic, itaconic, nadic, methyl nadic, hexahydrophthalic, succinic, tetrahydrophthalic, 1,2-naphthalenedicarboxylic, 1,2-tetrahydronaphthalene dicarboxylic acids, and the like. Further examples include such anhydrides in which hydrogen atoms have been substituted by halogen, hydroxyl or $C_{1-8}$ carbon atom alkyl, aryl or aralkyl groups such as the anhydrides of 3,4-dichlorophthalic, hexachlorodicycloheptadiene dicarboxylic (chlorendic), 8-hydroxyl-1,2-naphthalenedicarboxylic, 2,3-dimethyl maleic, 2-octyl-3-ethyl maleic, 4,5-dimethyl phthalic, 2-phenylethyl maleic, 2-tolyl maleic and the like.

As noted above, mixtures of saturated and unsaturated anhydrides can be utilized with generally maleic anhydride being preferred. Such polyesters are known to the art and to the literature and are generally made utilizing double metal cyanide complex catalysts. The method, preparation and scope of the various types of unsaturated polyesters which are suitable in the present invention are described in U.S. Pat. No. 3,538,043 which is hereby fully incorporated by reference with regard to all aspects thereof. For example, suitable catalysts for preparation of the polyester A block include zinchexacyanocobaltate and analogs thereof as well as various metalloporphyrins. Reaction temperatures generally include ambient to about 130° C. with from about 40° to about 80° C. being preferred. Such polyesters if made by utilizing maleic acid, can be isomerized with various conventional amines such as morpholine or piperidine to produce the fumarate isomer, as taught in U.S. Pat. No. 3,576,909, to Schmidle and Schmucker, which is hereby fully incorporated by reference with regard to all aspects thereof. Hydroxyl or carboxyl end groups are readily obtained by simply utilizing either an excess of the glycol or of the acid. Amine groups are added generally by post-reaction with an amine compound such as ethylene diamine, and the like. Such aspects are of course well known to the art and to the literature. Generally, such polyester A blocks have a significant molecular weight, as above 500. A preferred ester of the present invention is poly(propylenefumarate).

The monofunctional terminated unsaturated polyester A block is reacted with the B block flexible polymer to yield a block copolymer. If the flexible B block is mono-terminated, an AB type block copolymer will be formed. If the flexible polymer B block is a diterminated functional polymer, an ABA type block copolymer will be formed. However, if a difunctional terminated polyester A block is utilized with a difunctional terminated flexible B block, an ABA type block copolymer is produced along with generally small amounts of an A(-BA)$_n$ type block copolymer where n is 2 to 5. Typically, such mixtures contain a majority amount, that is at least 50 percent and often at least 70, 80, or even 90 percent by weight of the ABA block copolymer.

When the flexible polymer B block is hydroxyl terminated, desirably the unsaturated polyester A block contains a monofunctional, or less desirably a difunctional, terminal acid end group so that an ester reaction occurs and an ester linkage is formed. Similarly, if the flexible polymer B block contains a carboxyl terminal group, the unsaturated polyester A block end group is desirably a hydroxyl so that an ester linkage can be formed. In either situation, a conventional esterification reaction is carried out in a manner well known to the art. The net result is the formation of an AB or an ABA block polymer and possible small amounts of A(BA)$_n$ block copolymer having an ester linkage between the blocks.

If the flexible B block is amine terminated, desirably the polyester A block has a monocarboxylic acid functional end group. Such a reaction is carried out in a conventional manner and results in an amide linkage. Alternatively, if the polyester A block is amine-terminated, a diisocyanate can be reacted with a mono- or di- hydroxyl terminated B block, so that the reaction product thereof with the amine-terminated A block results in a urea linkage.

Regardless of the type of linkage formed between the "A" block and the "B" block, the reaction conditions for forming such linkages are well known to the art and to the literature, and result in the formation of a novel block copolymer. Such reactions including the conditions thereof, etc., as well as the linkage reactions set forth hereinbelow are more fully defined in *Advanced Organic Chemistry, Reactions, Mechanisms, and Structures*, J. March, 2nd Edition, McGraw Hill, New York, N.Y., 1977, which is hereby fully incorporated by reference including subsequent editions thereof.

It is to be understood that the A and B type blocks are typically preformed polymers which are reacted together and that no in situ polymerization of the A block or the B block occurs. In other words, the present invention is generally free of in situ polymerization or polymerization of one of the blocks on an existing block when the molecular weight of the A block is from about 500 or 600 to about 5,000.

It is also within the scope of the present invention to utilize a polyester A segment of very low molecular weight, such as for example from about 100 to about 500 or 600, wherein the ester segment or A block is merely the in situ reaction of a single or a few dicarboxylic anhydride and cyclic oxide molecules, such as maleic anhydride and propylene oxide. Preferably, the flexible B block is hydroxyl terminated. Such low molecular weight polyester A blocks result in a block copolymer having a high ratio or amount of the flexible polymer A block.

To prepare such low molecular weight A segments or blocks, it is advantageous to react the hydroxy terminated flexible B segment directly with the cyclic anhydride and propylene oxide. Suitable catalysts for the reaction include the double metal cyanide complex catalysts described above as well as the various titanates and alkyl substituted tin compounds like dibutyltin oxide. Preferred anhydrides for making such low molecular weight A segments have unsaturation such as maleic, tetrahydrophthalic, itaconic, nadic, methyl nadic and the like, although mixtures of unsaturated and saturated cyclic anhydrides may also be used. Generally, any cyclic oxide can be used with ethylene and propylene oxides being preferred.

According to the preferred embodiment of the present invention, the flexible polymer B block is hydroxyl terminated and is reacted with a monohydroxyl terminated unsaturated polyester A block through the utilization of a polyisocyanate to yield a block copolymer having a minimum molecular weight of 500 or 600. That is, a polyisocyanate is reacted with the hydroxyl end group of the flexible polymer B block thereby leaving a free isocyanate group which is subsequently reacted with the hydroxyl end group of the unsaturated polyester A block. Examples of polyisocyanates which can be utilized generally have the formula

R(NCO)$_n$ where n is generally about 2 (i.e. a diisocyanate) although it can be slightly higher or lower as when mixtures are utilized. R is an aliphatic having from about 2 to about 20 carbon atoms with from about 6 to about 15 carbon atoms being preferred or an aromatic including an alkyl substituted aromatic having from about 6 to about 20 carbon atoms, with from about 6 to about 15 carbon atoms being preferred, or combinations thereof. Examples of suitable diisocyanates include 1,6-diisocyanato hexane, 2,2,4-and/or 2,4,4-trimethyl hexamethylene diisocyanate, p-and m-tetramethyl xylene diisocyanate, dicyclohexylmethane-4,4'-diisocyanate (hydrogenated MDI), 4,4-methylene diphenyl isocyanate (MDI), p- and m-phenylene diisocyanate, 2,4- and-/or 2,6-toluene diisocyanate (TDI), durene-1,4-diisocyanate, isophorone diisocyanate, (IPDI) isopropylene-bis-(p-phenyl isocyanate) and sulfone-bis-(p-phenyl isocyanate). Also useful are diisocyanates prepared by capping low molecular weight, that is less than 300, diols, ester diols or diamines with diisocyanates, such as the reaction products of one mole of 1,4-butanediol or bis-(4-hydroxylbutyl)-succinate (molecular weight=262) with two moles of hexamethylene diisocyanate. TDI and IPDI are preferred for reasons set forth herein below. The reaction between the diisocyanate and the hydroxyl terminated flexible polymeric B block is carried out in an inert atmosphere such as nitrogen, at ambient temperatures and up to 30° C., desirably in the presence of urethane catalysts. Such catalysts are known to the art as well as to the literature and generally include tin compounds such as various stannous carboxylates, for example stannous acetate, stannous octoate, stannous laurate, stannous oleate and the like; or dialkyl tin salts of carboxylic acids such as dibutyltin diacetate, dibutyltin dilaurate, dibutyltin maleate, dibutyltin di-2-ethylhexoate, dilauryltin diacetate, dioctyltin diacetate and the like. Similarly, there can be used a trialkyltin hydroxide, dialkyltin oxide or dialkyltin chloride. As an alternative or in addition to the above tin compounds, various tertiary amines can be used such as triethylamine, benzyldimethylamine, triethylenediamine and tetramethylbutanediamine. The tin catalysts, when utilized, are generally used in amounts of 0.5 parts or less, i.e., in the range of about 0.01 to 0.5 parts, by weight per 100 parts of prepolymer. The tertiary amine catalysts, when utilized, can be used in amounts of 0.01 to about 5 parts by weight per 100 parts of prepolymer.

It is an important aspect of the present invention that the reaction of the diisocyanate with mono- or di- hydroxyl terminated flexible polymer B block occurs separately, that is, not in the presence of, in the absence of, or free from the mono- or di- hydroxyl functional unsaturated polyester A block. This ensures that a random copolymer containing block segments therein is not produced. Moreover, it is another important aspect of the present invention to utilize diisocyanate catalysts which have differential reaction rates with regard to the two isocyanate end groups. This is to ensure that only one of the groups reacts with the hydroxyl terminated flexible B block and the remaining unit generally remains unreacted until subsequent reaction of the monohydroxyl terminated polyester A block. For this reason, TDI and IPDI are preferred. The amount of the diisocyanate utilized is generally an equivalent amount to the hydroxyl groups in the flexible B block and thus is an equivalent ratio of from about 0.8 to about 1.2, and desirably from about 0.9 to about 1.1. Similarly, the amount of the polyester block A is generally an equivalent amount to the urethane linkages of the flexible B block, be it one linkage or two linkages per B block.

The mono- or di- hydroxyl terminated unsaturated polyester A block is then subsequently added to the vessel or solution containing the urethane terminated flexible polymer B block and reacted therewith in a conventional manner well known to the art and to the literature. The result is a urethane linkage between the polyester A block and the flexible polymer B block.

A distinct advantage of utilizing the urethane reaction route is that a low temperature reaction can be carried out which minimizes side reactions and that no unreacted compounds remain which have to be removed from the reaction product.

Another method of making a mixture of block copolymers containing a large amount of AB block copolymer is to react a diisocyanate-terminated flexible polymer B block having two free NCO groups thereon with an approximately equivalent amount of a low molecular weight alcohol and then subsequently reacting the product with an approximately equivalent amount of the functional terminated unsaturated polyester A block. The flexible polymer B block will contain a mixture of alcohol terminated end groups, unreacted urethane end groups, or both. The low molecular weight alcohol can be methanol, ethanol, n-propanol, isopropanol, t-butanol, and the like. In lieu of the low molecular weight saturated alcohol, a functional compound containing an ethylenically unsaturated polymerizable group can be utilized, such as hydroxy-styrene, hydroxy-ethyl-acrylate, methacrylate, or allyl alcohol.

Another preferred embodiment relates to the preparation of the low molecular weight A blocks which involves the reaction of hydroxyl terminated B blocks with a cyclic unsaturated anhydride and an alkalene oxide as noted above. Mixtures of saturated and unsaturated anhydrides can also be used.

Another aspect of the present invention is that the above-noted AB, or ABA, or A(BA)$_n$ block copolymers can be cured. Curing can occur utilizing conventional compounds such as ethylenically unsaturated compounds, for example vinyl or allyl compounds, and conventional free radical catalyst. Examples of ethylenically unsaturated compounds include styrene, a preferred compound, vinyl toluene, divinyl benzene, diallyl phthalate, and the like; acrylic acid esters and methacrylic acid esters wherein the ester portion is an alkyl having from 1 to 10 carbon atoms such as methylacrylate, ethylacrylate, n-butylacrylate, 2-ethylhexylacrylate, methyl methacrylate, ethylene glycol dimethacrylate, and the like. Other unsaturated monomers include vinyl acetate, diallyl maleate, diallyl fumarate, vinyl propionate, triallylcyanurate, and the like, as well as mixtures thereof. The amount of such compounds based upon 100 parts by weight of the block copolymers can generally vary from about 1 to about 500 parts by weight, and desirably from about 1 to about 100 parts by weight. The free radical initiators can include organic peroxides and hydroperoxides such as benzoyl peroxide, dicumyl peroxide, cumene hydroperoxide, paramenthane hydroperoxide, and the like, used alone or with redox systems; diazo compounds such as azobisisobutyronitrile, and the like; persulfate salts such as sodium, potassium, and ammonium persulfate, used alone or with redox systems; and the use of ultraviolet light with photo-sensitive agents such as benzophenone, triphenylphosphine, organic diazos, and the like.

The invention will be understood by reference to the following examples setting forth the preparation of unsaturated polyester-blocked flexible polymer compositions.

Example 1

Poly(propylene fumarate)-b-poly(butadiene)b-poly(propylene fumarate) triblock.

In a 1-L resin kettle equipped with thermometer, heating mantle and stirring were charged 203 g (70 mmoles —OH) of BFG Hycar® 2,000×169 (a dihydroxy-terminated polybutadiene), 263 g of styrene, 15.7 g (141 mmoles total —NCO) of isophorone diisocyanate, 2.3 g of zinc stearate, and 1.4 g of DABCO ® T9 catalyst. The materials were mixed thoroughly under nitrogen and warmed to 70° C. After two hours 80 g (70 mmoles —OH) of a 80 percent solids in styrene solution of a mono-hydroxy unsaturated polyester (polypropylene fumarate, 850 MW) was added to the reaction mixture, along with 2.5 g of 10 percent benzoquinone in diallyl phthalate, and 0.5 g of DABCO ® T9 catalyst. The reaction mixture was cooled after three hours to room temperature, and the solution poured into a suitable container. The triblock had a flexible polymer to unsaturated polyester weight ratio of 3.2 to 1.0, and contained 50 percent solids in styrene.

Example 2

Poly(propylene fumarate)-b-poly(butadiene-CO-acrylonitrile)-poly(propylene fumarate) triblock The above triblock was prepared by charging a 2-L resin kettle as above with 600 g (370 mmoles —OH) of Hycar ® 1300×34 (a dihydroxy-terminated poly(-butadiene-CO-acrylonitrile, 26 percent AN content) and 480 g of styrene which was stirred overnight under nitrogen to dissolve. To the stirred solution was then added 52 g (600 mmoles total —NCO) of toluene diisocyanate, and 2.0 g DABCO ® T12 catalyst. The mixture was stirred for one-half hour during which time the temperature rose to 37° C., followed by the addition of 675 g (350 mmoles —OH) of an 80 percent solids in styrene solution of a mono-hydroxy unsaturated polyester (polypropylene fumarate, approx. 1600 MW). The mixture was kept at 37° C. with stirring for six hours, and then poured into a container. The triblock had a flexible polymer to unsaturated polyester weight ratio of 1.1 to 1.0, and contained 65 percent solids in styrene.

Example 3

Poly(propylene fumarate)-b-poly(butadiene) block copolymer

The above block copolymer was prepared by charging 200 g (70 mmoles —OH) of Hycar ® 2,000×169 to a 1-L resin kettle along with 234 g of styrene, 12.5 g (113 mmoles total —NCO) isophorone diisocyanate, 2.0 g of zinc stearate, and 2.0 g DABCO ® T9 catalyst. The starting materials were mixed thoroughly under nitrogen, and then heated to 70° C. After 90 minutes, 1.7 g (28 mmoles —OH) of n-propanol was added, and after 2.5 hours 36 g (32 mmoles) of an 80 percent solids in styrene solution of a monohydroxy unsaturated polyester (polypropylene fumarate, approx. 1400 MW). The mixture was stirred for another three hours, then cooled and transferred to a suitable container. The block copolymer had a flexible polymer to unsaturated polyester weight ratio of 7.0 to 1.0, and contained 53 percent solids in styrene. This composition was a mixture containing large amounts of an AB block copolymer.

Example 4

Poly(propylene fumarate)-b-poly(butadiene-CO-acrylonitrile) block copolymer

The above block copolymer was prepared in a 1-L resin kettle as above with a charge of 361 g (225 mmoles —OH) Hycar ® 1300×34 and 175 g (210 mmoles total —OH) of 80 percent solids in styrene solution of dihydroxy unsaturated polyester (polypropylene fumarate, approximately 1400 MW), which were mixed thoroughly at 110° C. under vacuum for 90 minutes. The blend was cooled to 80° C. under nitrogen, and 21.6 g (250 mmoles total —NCO) of TDI added followed by stirring for ten minutes. DABCO ® T-12 catalyst (0.8 g) was added, causing an immediate increase in viscosity. Stirring was continued for one hour and the mixture cooled to 50° C., followed by the addition of 531 g of styrene. The solution was transferred to a suitable container. The flexible polymer to unsaturated polyester weight ratio of this additive was 2.6 to 1.0, and the solution contained 48 percent solids in styrene. This composition was a mixture containing A(BA)$_n$ block copolymers.

Example 5

Poly(propylene fumarate)-b-poly(butadiene-co-acrylonitrile) block copolymer

The above block copolymer was prepared by charging a 500-ml resin kettle with 189 g of a solution of Hycar ® 1300×31 (dicarboxy terminated polybutadiene-co-acrylonitrile, 10 percent AN content; 48.5 weight percent, 91.5 g, 51 mmoles carboxyl) and dihydroxy terminated polypropylene fumarate (1300 MW; 51.5 percent, 97.5 g, 150 mmoles —OH). The kettle was heated under vacuum at 150° to 160° C. for two hours to remove water. The product was transferred to a suitable container. The block copolymer had a flexible polymer to unsaturated polyester weight ratio of 0.9 to 1.0. This composition contained ABA block copolymers.

Example 6

Poly(propylene fumarate)-b-poly(butadiene-co-acrylonitrile) block copolymer

The above block copolymer was prepared by charging a 1.5-L resin kettle with 508 g (726 mmoles —OH) of unsaturated polyester (dihydroxy terminated polypropylene fumarate, approximately 1400 MW) 404 g (234 mmoles carboxyl of Hycar ® 1300×13 (dicarboxy terminated polybutadiene-co-acrylonitrile, 26 percent AN content), 0.4 g benzoquinone, and 0.4 g of triphenylphosphonium bromide. The mixture was stirred and heated to 150° C. under vacuum for four hours. After cooling to room temperature, 508 g of styrene was added and mixed to dissolve the polymer. The product was transferred to a suitable container. The block copolymer had a flexible polymer to unsaturated polyester ratio of 0.8 to 1.0, and contained 57 percent solids in styrene. This composition contained ABA block copolymers.

Example 7

Poly(propylene fumarate)-b-poly(tetrahydrofuran)-b-poly(propylene fumarate) triblock The above triblock was prepared by combining 400 grams of isocyanate-terminated poly(tetrahydrofuran 347 mmoles NCO), available from Air Products under the trademark PET90A, 312 grams of toluene, 3 grams of DABCO ® T9 ® catalyst, available from Air Products and Chemical Inc., and 224 grams of a solution of mono-hydroxy-terminated poly(propylene fumarate) (80 percent solids in styrene, 347 mmoles total —OH) in a one liter resin kettle equipped with nitrogen purge, a heating mantle, and a stirrer. The reagents were thoroughly mixed at room temperature under nitrogen, after which the contents were heated and maintained at 40° C. until the reaction was complete. The progress of the reaction was monitored using FTIR. Completion of the reaction was marked by the disappearance of the —NCO absorbance from the IR spectrum, at which time the product was cooled to room temperature. This triblock copolymer had a flexible polymer to unsaturated polyester ratio of approximately 2 to 1.

Example 8

A poly(propylene fumarate)-b-poly(butadiene)-b-poly(propylene fumarate) triblock The above triblock was prepared by combining, in a one liter resin kettle equipped with nitrogen purge, heating mantle, and stirrer, 500 grams of hydroxy-terminated polybutadiene (137 mmoles total OH), available from the B. F. Goodrich Chemical Company under the trademark HYCAR ® 2,000×169 ®, 310 grams of toluene, 31 grams of isophorone diisocyanate having 279 mmoles total —NCO, and 3 grams of DABCO ® T9 ® catalyst. The contents were thoroughly mixed under nitrogen, and then warmed to 60° C. for 2.5 hours. To the kettle were added 93 grams of a solution of monohydroxy-terminated poly(propylene fumarate) (80 percent solids in styrene, 144 mmoles total —OH), and 150 grams of toluene to reduce the viscosity. The contents were reacted for about 3 hours at 60° C. until the IR spectrum indicated complete consumption of —NCO. The product was then cooled to room temperature. This triblock copolymer had a flexible polymer to unsaturated polyester ratio of 6.2 to 1.0.

The above-identified diblock and triblock, etc., polyester-flexible polymer copolymers can be utilized as toughening agents in a variety of plastics such as unsaturated polyesters or vinyl ester resins. Moreover, they can be directly applied to a fiber structure and cured to coat the same and alleviate stress cracking on the surface of the fibers. Subsequently, the fiber structure coated with the cured polyester-flexible polymer block copolymers of the present invention can be utilized in various matrix formations such as in sheet molding coatings, in the preparation of sheet resins containing fiber reinforcement therein, in the preparation of fiber structures utilized in mats, nonwovens, wovens, and the like, in wet lay-up sheets, in resins utilized in injection molding, bulk molding, and the like.

DETAILED DESCRIPTION OF IN-MOLD COATING COMPOSITIONS

An in-mold coating for molded thermoset plastic parts using the AB, ABA, or A(BA)$_n$ block copolymers of the Detailed Description of the Block Copolymers has greater elongation and flexural strain to failure than previous in-mold coatings while maintaining good surface quality and paintability. The in-mold coating can alternatively use certain telechelic flexible polymers in lieu of the AB, ABA, or A(BA)$_n$ block copolymers or in combination with them.

An in-mold coating needs to have low viscosity so that it can flow out in an even layer over large compression molded parts in relatively short periods of time. It is also desirable that the coating have storage stability such that it does not prematurely cure nor phase separate during storage or equipment shutdowns. An in-mold coating needs resistance to abrasion, solvents, and external deformations while retaining good adhesion to the substrate and sufficient flexibility to prevent cracking on flexural strains. In-mold coating components are well known to the art and described in patents such as U.S. Pat. No. 4,515,710 which is hereby incorporated by reference. The components and processing of that patent can be included in the present composition. In that the coating is chemically crosslinked by heating, it is generally known as a thermoset.

The components of this in-mold coating include a) polymerizable vinyl ester resin, b) ethylenically unsaturated monomers, c) low profile additive and/or adhesion promoter, d) mold release agents, e) a telechelic flexible polymer or an AB, ABA, or A(BA)$_n$ block copolymers where the B block is a flexible polymer and the A block is an unsaturated polyester and n is from 1 to 5, f) free radical source, and optionally, carbon black or conductive filler, and/or nonconductive fillers. The parts by weight recited are based on each component before diluting or dissolving them in other components.

a. The polymerizable vinyl ester resin is well known to the art, is commercially available, and is the reaction product of a poly epoxide and an unsaturated monocarboxylic acid, having at least two acrylate (or methacrylate or ethacrylate) groups. Said monocarboxylic acid preferably has 3 to 10 carbon atoms. It can be prepared from reacting acrylic, methacrylic, or ethacrylic acid and so forth with an epoxy, tetrabromo Bisphenol A epoxy, phenolic novolac epoxy, tetraphenylolethane epoxy, dicycloaliphatic epoxy, and so forth. Mixtures of these epoxy based vinyl ester oligomers may be used. Of these materials, it is preferred to use a diacrylate terminated Bisphenol A epoxy oligomer. They have weight average molecular weights from about 500 to 1500 and desirable from about 500 to about 1000. Further examples of vinyl ester resins are given in *Developments in Reinforced Plastics*-1, Resin Matrix Aspects, edited by G. Pritchard, Applied Science Publishers Ltd: London 1980, Chapter 2, pages 29–58, which is hereby incorporated by reference. The vinyl ester resin is used in the amount of 100 parts by weight.

b. One or more ethylenically unsaturated monomers are used to copolymerize with and to crosslink the copolymerizable oligomers. They include styrene (preferred), alpha methyl styrene, vinyl toluene, t-butyl styrene, chlorostyrene, methylmethacrylate, diallyl phthalate (with styrene or methyl methacrylate and the like), triallyl cyanurate, triallyl isocyanurate, divinyl benzene, methyl acrylate and so forth, and mixtures thereof. The unsaturated ethylenically unsaturated monomers are used from about 80 to about 200 parts and desirably from about 100 to about 160 parts by weight per 100 parts by weight of polymerizable epoxy based oligomer, that is the vinyl ester resin.

For further copolymerization and crosslinking and to improve hardness of the resulting coating, the ethylenically unsaturated monomers used in the in-mold coating composition can be partially replaced with a monoethylenically unsaturated compound having a

group and having a —NH$_2$, —NH— and/or —OH group. Examples of such monomeric compounds are hydroxyl propyl methacrylate (preferred), hydroxyethyl methacrylate, hydroxy ethyl acrylate, hydroxy ethyl crotonate, hydroxypropyl acrylate, hydroxy polypropylene methacrylate, hydroxy polyoxyethylene methacrylate, acrylamide, methacrylamide, N-hydroxymethyl acrylamide, N-hydroxymethyl methacrylamide and so forth, and mixtures of the same. These ethylenically unsaturated monomers having polar groups can be used in an amount of from about 10 to about 120 parts by weight per 100 parts by weight of the vinyl ester resin.

c. Low profile additives are included to minimize shrinkage on curing. Typical low profile additives are well known to the art and include poly(vinyl acetate), saturated polyesters, polyacrylates or polymethacrylates, saturated polyester urethanes, and the like. A preferred low profile additive is carboxylated poly(vinyl acetate) which tends to improve paint adhesion to the coating and the hardness of the coating. The acid number of the carboxylated poly(vinyl acetate) can range from 0 to 4. These can be used from about 5 to about 90 parts, preferably 10 to 60 parts by weight per 100 parts by weight of vinyl ester resin.

d. Mold release agents include zinc salts of fatty acids having at least 10 carbon atoms or mixtures thereof. The fatty acid salts of zinc appear to function as a mold release agent and as secondary accelerator for cure. Fatty acids are well known. See "Organic Chemistry" Fieser and Fieser, D. C. Health and Company, Boston 1944 pages 88, 381-390, 398 and 401, and "Hackh's Chemical Dictionary," Grant McGraw Hill Book Company, New York, 1969, P. 261. Examples of zinc salts are zinc palmitate, zinc stearate, zinc ricinoleate and the like. Zinc salts of saturated fatty acids such as zinc stearate are preferred. The zinc salt is used in an amount of from about 0.2 to about 5 parts by weight per 100 parts by weight of the vinyl ester resin.

A calcium salt of a fatty acid having at least 10 carbon atoms in an amount of from about 0.2 to 5 parts by weight of calcium salt per 100 parts by weight of the polymerizable epoxy based oligomer can be used in the in-mold coating composition as a mold release agent and to control the rate of the cure. These fatty acids are well known, as seen above for zinc. Mixtures of calcium salts of the fatty acids can be used. Examples of some calcium salts are calcium stearate, calcium palmitate, calcium oleate and the like. It is preferred to use the calcium salt of a saturated fatty acid like calcium stearate.

e. The telechelic flexible polymers can have hydroxyl functional end groups. They can desirably have average functionalities per polymer of from about 1.5 to about 3.0, and preferably from about 1.7 to about 2.5. These polymers can have more than two terminal ends because of potential grafting reactions with diene polymerizations. The flexible polymers have a Tg of about 0 or less, desirably below −20° C., often are liquid, and are readily known in the art and to the literature. These are the same flexible polymers B used in the AB or ABA block copolymers. Their molecular weight is from about 500 to about 20,000, and desirably from about 500 to about 5,000. They can be made from any polymerization method including free radical and anionic methods. Polymers from diene monomers (especially conjugated dienes) are preferred along with copolymers of dienes and vinylic monomers. Vinylic monomers useful in this application include styrene; substituted styrenes such as alpha methyl styrene or ortho, meta, para alkyl substituted styrenes, and acrylonitrile. The preferred polymers are poly(butadiene) and poly(butadiene-co-acrylonitrile).

The AB or ABA block copolymers can be any of the AB, ABA, or A(BA)$_n$ block copolymers described in the Detailed Description. The preferred B blocks are those from conjugated dienes such as butadiene or copolymers from conjugated dienes such as butadiene-styrene or butadiene acrylonitrile copolymers. The B blocks can be made by any polymerization method including free radical or anionic methods. The B blocks for this application desirably have molecular weights from about 500 to about 20,000, and preferably from about 500 to about 5,000. Preferably the A blocks are monofunctional. Methods to prepare monofunctional polyesters are disclosed in U.S. Pat. No. 3,538,043 to R. J. Herold, which is hereby incorporated by reference.

The telechelic flexible polymers or the AB, ABA, or A(BA)$_n$ block copolymers can be used singly or in combination to result in from about 1 to about 35, desirably from about 2 to about 30, and preferably from about 4 to about 20 parts by weight flexible polymer B based upon 100 parts by weight of the vinyl ester resin. For the purposes of this application, the A block of said block copolymers will not be counted in the parts by weight of flexible polymer.

f. An organic free-radical source or free radical generating initiator (catalyst) such as a peroxide is used to catalyze the polymerization, copolymerization and/or crosslinking of the ethylenically unsaturated oligomers and the other ethylenically unsaturated materials. Examples of free-radical initiators include tertiary butyl perbenzoate, tertiary butyl peroctoate in diallyl phthalate, diacetyl peroxide in dimethyl phthalate, dibenzoyl peroxide, di(p-chlorobenzoyl) peroxide in dibutyl phthalate, di(2,4-dichlorobenzoyl) peroxide with dibutyl phthalate, dilauroyl peroxide, methyl ethyl ketone peroxide, cyclohexanone peroxide in dibutyl phthalate, 3,5-dihydroxy-3,4-dimethyl-1,2-dioxacyclopentane, t-butylperoxy(2-ethyl hexanoate), caprylyl peroxide, 2,5-dimethyl-2,5-di(benzoyl peroxy) hexane, 1-hydroxycyclohexyl hydroperoxide-1, t-butyl peroxy (2-ethylbutyrate), 2,5-dimethyl-2,5-bis(t-butyl peroxy) hexane, cumyl hydroperoxide, diacetyl peroxide, t-butyl hydroperoxide, ditertiary butyl peroxide, 3,5-dihydroxy3,5-dimethyl-1,2-oxacyclopentane, and 1,1-bis(t-butylperoxy)-3,3,5-trimethyl cyclohexane and the like and mixtures thereof. It is desirably sometimes to use mixtures of initiators to take advantage of their different decomposition rates and times at different temperatures and so forth. A preferred initiator to use is tertiary butyl perbenzoate. The peroxide initiator should be used in an amount sufficient to overcome the effect of the inhibitor and to cause crosslinking or curing of the ethylenically unsaturated materials. In general, the peroxide initiator is used in an amount of up to about 5 percent, preferably up to about 2 percent, by weight based on the weight of the ethylenically unsaturated materials employed in the in-mold coating composition.

To prevent premature gelation of the ethylenically unsaturated materials and to provide for improved shelf-life or storageability, inhibitors are added in the desired amount to the composition or are provided in the raw materials before use. Examples of inhibitors are hydroquinone, benzoquinone, p-t-butyl catechol and the like and mixtures thereof.

An accelerator can be used for the peroxide initiator and is a material such as a drier, e.g., cobalt octoate (preferred). Other materials which may be used are zinc naphthenate, lead naphthenate, cobalt naphthenate and manganese naphthenate. Soluble Co, Mn, and Pb salts of linoleic acid, also, may be used. Mixtures of accelerators may be used. The accelerator is used in an amount of from about 0.01 to 1 part by weight per 100 parts by weight of the polymerizable epoxy based oligomer.

Conductive carbon black can be used in the in-mold coating composition in an amount of from about 5 to about 40 parts and desirably from about 10 to about 30 parts by weight per 100 parts by weight of the polymerizable epoxy based oligomer. These are high structure carbon blacks such as Vulcan ™ XC-72R from Cabot Corporation. They achieve conductivity by achieving a critical concentration in the coating such that a continuous carbon network is created that conducts electricity. Other conductive fillers could also be used.

A filler can be used in the in-mold coating composition in an amount of from about 50 to 155 parts by weight per 100 parts by weight of the polymerizable epoxy based oligomer. Examples of fillers include clay, MgO, Mg(OH)$_2$, CaCO$_3$, silica, calcium silicate, mica, aluminum hydroxide, barium sulfate, talc, hydrated silica, magnesium carbonate and mixtures of the same. The fillers should be finely divided. Of these fillers, it is preferred to use talc. Fillers can afford the desired viscosity and flow to the in-mold composition for molding and contribute to the desired physical properties in the resulting thermoset in-mold coating. Fillers, also, may improve adhesion. However, care should be exercised in the use of high filler contents as this may give high viscosities and result in flow and handling difficulties.

The in-mold coating composition additionally optionally may be compounded with other ingredients such as mold release agents, antidegradants, UV absorbers, paraffin wax, solid glass or resin micro-spheres, thickening agents, low shrink additives and the like. These compounding ingredients should be used in amounts sufficient to provide satisfactory results.

For ease in handling, materials like carboxylated polyvinylacetate may be dissolved in a reactive monomer like styrene. The viscosity of the oligomers may be reduced by dilution with styrene and the like. The ingredients of the in-mold composition should be readily mixed by stirring together the monomers and polymers. Subsequently, the other ingredients and the fillers can be added. The viscosity will increase when the filler is added. They can be handled at ambient or room temperature or temperatures below the polymerization temperature so that they may be readily pumped to the mold and injected into the same. The ingredients may be warmed or heated before or during mixing and mixed in steps to facilitate thorough mixing, dispersion and solution of the same. Also, the bulk of the ingredients can be thoroughly mixed and the remainder, including the catalyst, separately mixed and then both can be pumped to a mixing head to be mixed together and then injected into the mold.

With the peroxide initiator or catalyst, the in-mold composition exhibits a shelf-life at room temperature (about 25° C.) of about a week, and without the initiator it exhibits a shelf life of several months at room temperature. The initiator is preferably added to the composition and thoroughly mixed therewith just before molding.

All of the ingredients of the in-mold coating composition should be kept dry or have a minimal amount of moisture or the water content should be controlled to obtain reproducible results and to prevent pore formation.

Mixing of the ingredients of the in-mold composition should be thorough. Injection molding, compression molding, transfer molding, or other molding apparatus or machines can be used for the in-mold coating. Molding apparatus and methods may be found in U.S. Pat. Nos. 4,076,780; 4,076,788; 4,081,578; 4,082,486; 4,189,517; 4,222,929; 4,245,006; 4,239,796; 4,239,808 and 4,331,735. Please see also, "Proceedings of the Thirty-Second Annual Conference Reinforced Plastics/Composites Institute," SPI Washington, February, 1977, Griffith et al., Section 2-C, pages 1–3 and "33rd Annual Technical Conference, 1978, Reinforced Plastics/Composites Institute, The Society of the Plastics Industry, Inc.," SPI Ongena Section 14-B, pages 1–7. The in-mold coating composition can be applied to the substrate and cured at a temperature of from about 290° to 310° F. and at a pressure of about 1000 psi for from about 0.5 to 3 minutes. This creates a laminate with a fiber reinforced plastic being the substrate.

The processes and products of the present invention can be used in the manufacture of automobile parts such as grille and headlamp assemblies, deck hoods, fenders, door panels and roofs, as well as in the manufacture of food trays, appliance and electrical components, furniture, machine covers, and guards, bathroom components, structural panels and so forth. The glass fiber reinforced thermoset plastic (FRP) such as the polyester resin or vinyl ester resin and glass fiber composition substrate to which the in-mold composition is applied can be a sheet molding compound (SMC) or a bulk molding compound (BMC), or other thermosetting FRP material as well as a high strength molding compound (HMC) or a thick molding compound. The FRP substrate can have from about 10 to 75 percent by weight of glass fibers. The SMC compound usually contains from about 25 to 30 percent by weight of glass fibers while the HMC compound may contain from about 55 to 60 percent by weight of glass fibers. The glass fiber reinforced thermoset plastic (FRP) substrate can be rigid or semirigid (may contain a flexibilizing moiety such as an adipate group in the polyester). The substrate, also, may contain other flexibilizing polymers, the elastomers and plastomers such as the styrene-butadiene block copolymers. Unsaturated polyester glass fiber thermosets are known as shown by "Modern Plastics Encyclopedia," 1975–1976, October, 1975, Vol. 52, No. 10A, McGraw-Hill, Inc., New York, pages 61, 62 and 105 to 107; "Modern Plastics Encyclopedia," 1979–1980, October, 1979, Volume 56, Number 10A, pages 55, 56, 58, 147 and 148 and "Modern Plastics Encyclopedia," 1980–81, October, 1980, Volume 57, Number 10A, pages 59, 60, and 151 to 153, McGraw-Hill, Inc., New York, N.Y.

The compositions of the present invention can exhibit good pumpability and flow in the mold. They can give rapid cures in time periods as low as 50 to 90 seconds at 300° F. They also show good adhesion to paints and can be used not only as an in-mold coating to cover blemishes but as a good conductive coating for electrostatic painting and as a primer for most paint finish systems such as soluble acrylic lacquers, acrylic dispersion lacquers, water borne acrylic enamels, high solids solution acrylic enamels, acrylic non-aqueous dispersions and urethanes.

The following example will serve to illustrate the present invention with more particularity to those skilled in the art. The flexural properties were evaluated using ASTM D790 while the tensile properties were evaluated using ASTM D638-89. In the example, the parts are parts by weight unless otherwise indicated.

Example 11 Modifier A

This material was prepared in a one-liter, three-neck resin kettle equipped with an air stirrer and addition funnel. The system as swept with a flow of nitrogen gas. Into the addition funnel was placed a solution of 125 g (198.75 mmoles —OH) of hydroxy-terminated polybutadiene, HTB (R20LM, Atochem®, approx. 1500 MW) in 246.5 g styrene. In the resin kettle was added 44.2 g (397.7 mmoles —NCO) of IPDI (isophorone diisocyanate aka [5-isocyanto-1-(isocyantomethyl)1,3,3-trimethylcyclohexane] and 1.7 g of DABCO® T12 (dibutyltin dilaurate, Air Products). The solution of HTB in styrene was added dropwise from the addition funnel to the rapidly stirred IPDI. Heat was applied to raise the temperature to 75° C. The contents were reacted for 1.5 hours.

The addition funnel was charged with a solution of 105 g (209. mmoles —OH) of mono-hydroxy-terminated poly(propylene fumarate), PPF, having a nominal molecular weight of 700, and 0.7 g DABCO® T12, dissolved in 26.3 g of styrene. The solution of PPF in styrene was added slowly to the above prepolymer solution contained in the resin kettle. The reaction mixture was maintained at a temperature of 65° C. for 4 hours and then allowed to cool to room temperature. The weight ratio of flexible polymer to PPF was 1.2:1.

The procedure used to prepare the block copolymer of this invention is considered to result in ABA-type block copolymer, as well as products from chain extension of hydroxy-terminated polybutadiene. This is evident by the multimodal shape of the molecular weight distributions.

Example 12 Modifier B

Modifier B was prepared according to Example 11 with hydroxy-terminated PPF having a nominal molecular weight of 1400 substituted for the corresponding PPF of 700 molecular weight. The weight ratio of HTB to PPF was 0.45:1.

Example 13 Modifier C

This material was prepared according to Example 11 by combining 122.47 g of hydroxy-terminated polybutadiene (42.9 moles —OH), available as Hycar® HTB 2000×169 having approximately 5000 MW from the B. F. Goodrich Chemical Company; 473 g styrene; 9.53 g IPDI (85.74 mmoles —NCO); and 0.3 g DABCO® T9 (stannous octoate) catalyst. To the prepolymer of IPDI and HTB 10 were added 71.25 g of a solution of 57 g mono-hydroxy-terminated PPF (42.6 mmoles —OH), nominal number average molecular weight of 1400, in 14.25 g styrene. The contents were reacted for 2 hours at 60° C. at which point the IR spectrum indicated complete consumption of —NCO. The material had a flexible polymer to PPF ratio of 2.1:1.

Example 14 Modifier D

Modifier D was prepared according to Example 11 by combining, in a one-liter resin kettle, 391 g of hydroxy-terminated polybutadiene (137 mmoles —OH, Hycar® 2000×169 having approximately 5000 MW), 310 g of toluene, 31 g IPDI (279 mmoles under nitrogen), and then warmed to 60° C. for 2.5 hours. To the kettle were added 74 g of a solution of mono-hydroxy-terminated PPF (144 mmoles —OH), nominal number average molecular weight of 700, and 150 g of toluene. The contents were reacted for about 3 hours at 60° C. until the IR spectrum indicated complete consumption of —NCO. The weight ratio of flexible polymer to PPF was 6.8:1.

Example 15 Modifier E

This material was prepared according to Example 14 with hydroxy-terminated polybutadiene (R45HT supplied by Atochem® approximately 3000 MW) substituted for Hycar® 2000×169 or an equivalent mole basis of OH groups. The weight ratio of flexible polymer to PPF was 2.3:1.

Example 16 Modifier F

Modifier F was prepared by charging an addition funnel attached to a one-liter resin kettle with 94.0 g (42.4 mmoles —OH) of hydroxy-terminated poly(butadiene-co-acrylonitrile) (available as HTBN Hycar® 1300×34, having approximately 4,000 MW, from B. F. Goodrich, containing 26 percent acrylonitrile) and 141 g styrene which was stirred under nitrogen. In the resin kettle was placed 9.41 g IPDI (84.67 mmoles —NCO) and 0.5 g DABCO® T12 catalyst. The solution of HTBN in styrene was added dropwise to the rapidly stirred IPDI liquid. After the initial exotherm, the reaction mixture was heated to 50° C. for 2 hours followed by the addition of a solution of 26.24 g (42.28 mmoles —OH) of mono-hydroxy-terminated PPF, having a nominal number average molecular weight of 700, in 6.6 g styrene. The contents were reacted for 2 days at 55° C. The weight ratio of flexible polymer to PPF was 3.6:1.

Example 17 Modifier G

This material was prepared according to Example 16 using a mono-hydroxy-terminated PPF having a higher nominal number average molecular weight of 1400, substituted for the PPF used in Example 16 on an equivalent mole basis of OH. The weight ratio of flexible polymer to PPF was 1.6:1.

The data in Tables II and III summarize four telechelic hydroxy-terminated flexible polymers and seven polyester-flexible block copolymers, evaluated a toughness modifiers for IMC.

Tables I, II, and III summarize the above data in table form giving the ratios of the components and functionality in more detail. Table IV gives a typical in-mold coating (IMC) formulation used to generate the physical properties data.

TABLE I

Preparation of Block Copolymers of Poly(propylene fumarate) and Flexible Polymers[a]

| Sample (Modifier) | HTB (HTBN) Type | $F_{OH}$ | Wt. (g) | mM —OH | IPDI Wt. (g) | mM —NCO | Mono-OH PPF MW (Approx.) | Wt. (g) | mM-OH | Wt. Ratio (HTB or HTBN)/PPF |
|---|---|---|---|---|---|---|---|---|---|---|
| B522-24 (Modifier A) | HTS R20LM | 2.5 | 125 | 198.75 | 44.2 | 397.7 | 700 | 105 | 209 | 1.2 |
| B522-23 (Modifier B) | HTB R20LM | 2.5 | 125 | 198.75 | 44.2 | 397.7 | 1400 | 280 | 209 | 0.45 |
| B516-35 (Modifier C) | HTB 2000X169 | 1.8 | 122 | 42.9 | 9.5 | 85.7 | 1400 | 57 | 42.6 | 2.1 |

TABLE I-continued

Preparation of Block Copolymers of Poly(propylene fumarate) and Flexible Polymers[a]

| Sample (Modifier) | HTB (HTBN) Type | $F_{OH}$ | Wt. (g) | mM —OH | IPDI Wt. (g) | mM —NCO | Mono-OH PPF MW (Approx.) | Wt. (g) | mM-OH | Wt. Ratio (HTB or HTBN)/PPF |
|---|---|---|---|---|---|---|---|---|---|---|
| B522-26 (Modifier D) | HTB 2000X169 | 1.8 | 391 | 137 | 31 | 279 | 700 | 74 | 144 | 6.8 |
| B522-21 (Modifier E) | HTB R45HT | 2.5 | 150 | 123 | 27.5 | 247.4 | 700 | 80.5 | 130 | 2.3 |
| B516-40 (Modifier F) | HTBN 1300X34 | 1.8 | 94 | 42.4 | 9.4 | 84.7 | 700 | 26.2 | 42.3 | 3.6 |
| B516-41 (Modifier G) | HTBN 1300X34 | 1.8 | 99 | 44.6 | 9.9 | 89.1 | 1400 | 61.6 | 46 | 1.6 |

[a]Poly(butadiene) and Poly(butadiene-co-acrylonitrile)

TABLE II

Hydroxy-Terminated Polymers Evaluated as Toughness Modifiers For In-Mold Coating

| Modifier | Description (Supplier) | Hydroxyl Functionality (approximate) |
|---|---|---|
| HTB R20LM | Hydroxy-terminated PolyBd (Atochem) ® (1500 MW) | 2.3 |
| HTB R45HT | Hydroxy-terminated PolyBd (Atochem) ® (3000 MW) | 2.3 |
| HTB 2000X169 | Hydroxy-terminated PolyBd (B. F. Goodrich) (5000 MW) | 1.8 |
| HTBN 1300X34 | Hydroxy-terminated Poly (Bd-co-AN), 26% AN (B. F. Goodrich) (4000 MW) | 1.8 |

TABLE III

Block Copolymers of Poly(propylene fumarate) End Block and Poly(butadiene) or Poly(butadiene-co-acrylonitrile) Center Blocks

| Modifier | Center Block | End Block (Nominal MW) |
|---|---|---|
| A | HTB (R20LM) (1500 MW) | PPF (700 NW) |
| B | HTB (R20LM) (1500 MW) | PPF (1400 NW) |
| C | HTB (2000X169) (5000 MW) | PPF (1400 MW) |
| D | HTB (2000X169) (5000 MW) | PPF (700 MW) |
| E | HTB (R45HT) (3000 MW) | PPF (700 MW) |
| F | HTBN (1300X34) (4000 MW) | PPF (700 MW) |
| G | HTBN (1300X34) (4000 MW) | PPF (1400 MW) |

TABLE IV

IMC FORMULATION

| | Weight In Parts |
|---|---|
| Modifiers of this Disclosure | Variable |
| Vinyl Ester Resin* | 100.00 |
| Styrene (monomer) | 85.00 |
| Low Profile Additive (poly(vinyl acetate)) | 10.00 |
| Hydroxypropyl Methacrylate | 30.00 |
| 2% Benzoquinone in Styrene | 0.14 |
| Zinc Stearate | 1.85 |
| Calcium Stearate | 0.45 |
| Cobalt Accelerator (12%) in Mineral Oil | 0.15 |
| Carbon Black | 8.50 |
| Talc | 80.00 |
| t-Butyl Peroxybenzoate | 1.60 |

*The molecular weight of the vinyl ester resin is nominally 800–1000.

Formulation and Curing of IMC Containing Additives

The materials described in Examples 11–17 were added to the IMC formulation shown in Table IV. The additives were evaluated at concentrations of 2.5 and 5.0 weight percent (calculated as the polybutadiene or poly(butadiene-co-acrylonitrile) content divided by the weight of the IMC composition. After the appropriate incorporation of the additives in the IMC formulation, the modified IMC's were cured into slabs, having dimensions of 15.24×5.08×0.25 cm and 5.08×5.08×0.25 cm, by compression molding.

Property Measurements

Flexural properties (ASTM D790) and tensile properties (ASTM 638-89) were measured at room temperature. The Mandrel Bending Test consisted of a series of slots of decreasing radius. The test is run by fitting the sample (2.54 cm×7.62 cm) into slot No. 1 (highest radius of curvature). If no failure occurs (i.e., the strip does not break), the test is repeated progressively with slots No. 2, 3, 4, etc., until failure occurs. The elongation is calculated using the following equation:

$$\% \text{ ELONGATION} = T/2Rf,$$

where T is the thickness of the sample in inches and Rf is the radius of curvature for the next higher radius at which failure did not occur.

Mechanical Properties of Modified IMC's

The effect of hydroxy-terminated polybutadienes, poly(butadiene-co-acrylonitrile) or unsaturated polyester flexible block copolymers on flexural and stress-strain properties are shown in Tables V, VI, and VII. Table V gives the properties using the commercial flexible materials used as received as additives. Table VI shows the properties of these flexible materials made into ABA block copolymers, as in Table I, used as additives on an equivalent rubber basis. Relative to unmodified IMC, flexible polymers of HTB and HTBN and their corresponding copolymers with PPF gave increased flexural moduli, flexural strength, tensile strength and elongation at break. This was obtained with no sacrifice in mold coverage and coating performance. Compared to an IMC control, the modified in-mold coated SMC's were equivalent in cross-hatch adhesion (Ford BI6-1), degree of cure, pencil hardness, pipe scratch resistance and chip resistance (Gravelometer test, GM 9508P and GM 9071P).

In general, flexural properties were enhanced at additive levels of 2.5 weight percent and then, for higher additive concentration (5.0 weight percent), flexural properties decreased. Notwithstanding the frequent breakage of samples at the jaw clamps of the Instron Tester, tensile strength and elongation at break are higher for the modified IMC samples.

The elongation, as measured by the Mandrel Bending Test, of three modified IMC's are compared with the IMC control in Table VIII. The higher elongation values of the IMC's containing hydroxy-terminated polybutadienes and an unsaturated polyester flexible block copolymer (Modifier A) indicate that the IMC compositions of this disclosure have higher resistance to crack initiation than unmodified IMC.

TABLE V

Flexural Data at Room Temperature of IMC containing Telechelic Modifiers

| Modifier | Wt % Rubber | Modulus (GPa) Low | Modulus (GPa) High | Strength (MPa) Low | Strength (MPa) High |
|---|---|---|---|---|---|
| IMC (Control) | — | 3.4 | 4.2 | 30.8 | 47.7 |
| HTB R45HT | 2.5 | 4.4 | 4.5 | 69.0 | 69.5 |
| HTB R45HT | 5.0 | 3.5 | 3.9 | 61.4 | 64.3 |
| HTB 2000X169 | 2.5 | 3.9 | 4.2 | 62.3 | 65.8 |
| HTB R20LM | 2.5 | 4.2 | 4.3 | 41.3 | 60.4 |
| HTB R20LM | 5.0 | 3.7 | 3.8 | 58.1 | 61.0 |
| HTBN 1300X34 | 2.5 | 4.4 | 4.6 | 58.8 | 60.4 |
| HTBN 1300X34 | 5.0 | 3.5 | 4.0 | 58.0 | 58.4 |

TABLE VI

Flexural Data at Room Temperature of IMC containing Block Copolymer Modifiers

| Modifiers of this Disclosure | Wt % Rubber | Modulus (GPa) Low | Modulus (GPa) High | Strength (MPa) Low | Strength (MPa) High |
|---|---|---|---|---|---|
| IMC (Control) | — | 3.4 | 4.2 | 30.8 | 47.7 |
| A | 2.5 | 3.8 | 4.6 | 70.7 | 78.0 |
|   | 5.0 | 3.3 | 3.5 | 38.0 | 68.0 |
| B | 2.5 | 4.0 | 4.4 | 65.7 | 73.8 |
|   | 5.0 | 3.5 | 4.2 | 45.7 | 69.4 |
| C | 2.5 | 3.8 | 4.4 | 50.0 | 74.1 |
|   | 5.0 | 3.6 | 3.8 | 49.2 | 57.0 |
| D | 2.5 | 3.6 | 4.0 | 52.7 | 67.0 |
|   | 5.0 | 3.2 | 3.5 | 56.2 | 73.6 |
| E | 2.5 | 3.6 | 3.6 | 48.4 | 70.0 |
|   | 5.0 | 3.8 | 4.3 | 66.7 | 66.7 |
| F | 2.5 | 4.0 | 4.7 | 62.6 | 65.8 |
|   | 5.0 | 4.1 | 4.3 | 65.9 | 67.0 |
| G | 2.5 | 3.8 | 4.4 | 61.0 | 65.1 |
|   | 5.0 | 3.8 | 3.8 | 57.4 | 72.2 |

TABLE VII

Tensile Strength and Elongation of IMC Containing Modifiers

| Modifier | Wt % Rubber | Tensile Strength (MPa) at RT Max | Tensile Strength (MPa) at RT Min | % Elongation at Break at RT Max | % Elongation at Break at RT Min |
|---|---|---|---|---|---|
| IMC (Control) | — | 30.1* | 17.7* | 0.6* | 0.4* |
| HTB R45HT | 2.5 | 36.2 | 19.5* | 1.3 | 0.4* |
| HTB 2000X169 | 2.5 | 37.6 | 18.6* | 1.5 | 0.6* |
| HTB R20LM | 2.5 | 36.1 | 23.6* | 1.3 | 0.6* |

TABLE VII-continued

Tensile Strength and Elongation of IMC Containing Modifiers

| Modifier | Wt % Rubber | Tensile Strength (MPa) at RT Max | Tensile Strength (MPa) at RT Min | % Elongation at Break at RT Max | % Elongation at Break at RT Min |
|---|---|---|---|---|---|
| HTBN 1300X34 | 2.5 | 31.9* | 22.3* | 1.0* | — |
| A | 2.5 | 42.1 | 40.4 | 1.3 | 1.2 |
| B | 2.5 | 41.5 | 20.3* | 1.4 | 0.3* |
| C | 5.0 | 32.5 | 27.8 | 2.0 | 1.1 |
| D | 2.5 | 31.1* | 23.6* | 0.7* | 0.5* |
| E | 2.5 | 44.1 | 17.0* | 1.7 | 0.4 |
| F | 2.5 | 29.6 | 27.7 | 1.4 | 1.3 |
| G | 2.5 | 39.6 | 38.4 | 1.6 | 1.5 |

*Sample broke at the jaw clamps of the Instron Tester.

TABLE VIII

Elongation of IMC Containing Modifiers from Mandrel Bending Test

| Sample* | Average % Elongation |
|---|---|
| IMC (Control) | 1.41 |
| IMC + HTB R45HT | 2.07 |
| IMC + HTB 2000X169 | 2.07 |
| IMC + B522-24 (Modifier A) | 1.79 |

*at 2.5 wt % rubber additive

The telechelic rubber polymers shown in Table V increased both the room temperature flexural modulus and room temperature flexural strength. These hydroxy terminated polymers have molecular weights from about 1500 to about 5000. In this in-mold coating recipe, the presence of these telechelic polymers does not cause detrimental effects on smoothness or coating performance.

The block copolymers of Table VI also show increased flexural modulus and strength at room temperature. Modifier A of this disclosure shows the most dramatic improvement in properties. The benefit of the poly(propylene fumarate) blocks can be seen from a comparison of Modifier A in Table VI with HTB R20LM in Table V. The effect of molecular weight of the poly(propylene fumarate) can be seen by comparing Modifier A and B in Table VI. The effect of changing the molecular weight of the poly(propylene fumarate) can also be seen by comparing Modifiers C and D or Modifiers F and G. The differences seem to be within experimental error.

Table VII shows the tensile and elongation are increased for in-mold coating compositions using the hydroxyl terminated telechelic polymers or the block copolymers of AB, ABA, or A(BA)$_n$ structure. Table VIII shows the Mandrel Bending Test gives improved percent elongation as would be predicted based on the tensile and flexural tests.

While in accordance with the Patent Statutes, the best mode and preferred embodiment has been set forth, the scope of the invention is not limited thereto, but rather by the scope of the attached claims.

What is claimed is:

1. A method comprising:
   in-mold coating a molded fiber reinforced thermoset polyester resin or thermoset vinyl ester resin composition containing from about 10 to about 75 percent by weight fibers with a thermosetting in-mold coating composition and curing said in-mold coating composition to form an adherent thermoset coating on said molded thermoset resin glass fiber composition, said in-mold coating composition comprising;

a) at least one polymerizable vinyl ester resin being the reaction product of a polyepoxide with unsaturated monocarboxylic acids having from 3 to 10 carbon atoms, said vinyl ester resin having a weight average molecular weight of from about 500 to about 1500, b) from about 80 to 200 parts by weight of at least one copolymerizable ethylenically unsaturated monomer, c) from about 5 to about 90 parts by weight of a low profile additive, d) an effective amount of a mold release agent, and e) from about 1 to about 35 parts by weight of at least one B polymer block, wherein said B polymer block is in the form of one or more of AB, ABA, or A(BA)$_n$ block copolymers where n is from 1 to 5 having one or more A blocks therein, said A blocks being unsaturated polyester condensation products of monomers consisting essentially of, one or more saturated cyclic ethers and/or glycols of up to 18 carbon atoms, reacted with one or more unsaturated dicarboxylic acids and/or anhydrides thereof having molecular weights from 98 to 400 and optionally one or more saturated dicarboxylic acids and/or anhydrides thereof of molecular weights from 98 to 400, and said B blocks being flexible polymers having a Tg of 0° C. or less and wherein said parts by wt. are per 100 parts by wt. of said vinyl ester resin.

2. The method of claim 1, wherein the in mold coating composition includes conductive carbon black and said A block has a number average molecular weight of from 100 to 500.

3. The method of claim 2, wherein the in-mold coating composition includes talc.

4. The method of claim 1 wherein the polymer B block has a number average molecular weight from about 500 to about 5,000.

5. A method according to claim 4, wherein the polymer B block is polybutadiene or poly(butadiene-acrylonitrile) and it is present from about 2 to about 30 parts by weight and wherein said A blocks have a molecular weight from above 500 to 2,000.

6. A method according to claim 1, wherein said B polymer blocks have a number average molecular weight of from about 500 to about 5,000 and wherein said B polymer blocks are present from about 2 to about 30 parts by weight per 100 parts by weight of the vinyl ester resin.

7. A method according to claim 6, wherein said B polymer blocks before coupling have a functionality of from about 1.7 to about 2.5 and said B polymer blocks are polybutadiene or poly(butadieneacrylonitrile) and said B polymer blocks are present from about 4 to about 20 parts by weight.

8. A method according to claim 1, wherein
a) is a diacrylate ester of a liquid Bisphenol A epoxy resin,
b) is at least 50 percent by weight styrene, and
d) is at least one zinc salt of a fatty acid.

9. A method according to claim 5, wherein
a) is a diacrylate ester of a liquid Bisphenol A epoxy resin,
b) is at least 50 percent by weight styrene, and
d) is at least one zinc salt of a fatty acid.

10. A method according to claim 7, wherein
a) is a diacrylate ester of a liquid Bisphenol A epoxy resin,
b) is at least 50 percent by weight styrene, and
d) is at least one zinc salt of a fatty acid.

11. A laminate comprising: an adherent, thermoset in-mold coating composition in-mold coated onto a molded thermoset resin, said molded thermoset resin optionally including from about 10 to 75 percent by weight of glass fibers, said in-mold coating composition comprising the reaction product of, at least one vinyl ester resin being the reaction product of an polyepoxide oligomer and unsaturated monocarboxylic acids having from 3 to 10 carbon atoms and said vinyl ester resin having a weight average molecular weight of from about 500 to 1,500, from about 80 to 200 parts by weight of at least one copolymerizable ethylenically unsaturated monomer, an effective amount of at least one mold release agent, from about 5 to about 90 parts by weight of a low profile additive, and from about 1 to about 35 parts by weight of at least one B polymer block, said B polymer block being in the form of one or more of AB, ABA, and A(BA)$_n$ block copolymers where n is from 1 to 5, said block copolymers having one or more A blocks which are one or more unsaturated polyesters being a condensation product of monomers consisting essentially of, one or more saturated cyclic ethers and/or glycols of up to 18 carbon atoms reacted with, one or more unsaturated dicarboxylic acids and/or anhydrides thereof having molecular weights from 98 to 400 and optionally one or more saturated dicarboxylic acids and/or anhydrides thereof having molecular weights from 98 to 400, and said B blocks being flexible polymers having a Tg of 0° C. or less wherein said parts by wt. are per 100 parts by wt. of said vinyl ester resin.

12. A laminate according to claim 11, wherein said in-mold coating composition includes from about 5 to about 40 parts by weight conductive carbon black.

13. A laminate according to claim 11, wherein said one or more of AB, ABA, and A(BA)$_n$ block copolymers has B blocks comprised of poly(butadiene) or polybutadiene-acrylonitrile) and A blocks of number average molecular weight from above 500 to 2,000.

14. A laminate according to claim 11, wherein said one or more of AB, ABA, and A(BA)$_n$ block copolymers have B blocks comprised of poly (butadiene) or poly (butadiene-acrylonitrile) and A blocks of number average molecular weight from 100 to 500.

15. A laminate according to claim 11, wherein said vinyl ester resin is a diacrylate ester of liquid Bisphenol A epoxy resin, said b component is at least 50 wt % styrene, and said B polymer blocks are limited to a total of from about 4 to about 20 parts by weight.

* * * * *